(12) United States Patent
Nassouri et al.

(10) Patent No.: US 11,400,929 B2
(45) Date of Patent: Aug. 2, 2022

(54) METHOD AND APPARATUS FOR VISION BASED LATERAL ACCELERATION PREDICTION

(71) Applicant: GM GLOBAL TECHNOLOGY OPERATIONS LLC, Detroit, MI (US)

(72) Inventors: Crystal Nassouri, West Bloomfield, MI (US); Tyler J. Jamieson, North York (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 192 days.

(21) Appl. No.: 16/424,111

(22) Filed: May 28, 2019

(65) Prior Publication Data
US 2020/0377082 A1    Dec. 3, 2020

(51) Int. Cl.
*B60W 30/095* (2012.01)
*B60W 40/072* (2012.01)
*B60W 30/09* (2012.01)

(52) U.S. Cl.
CPC ........ *B60W 30/0956* (2013.01); *B60W 30/09* (2013.01); *B60W 40/072* (2013.01); *B60W 2554/803* (2020.02)

(58) Field of Classification Search
CPC ............. B60W 30/0956; B60W 30/09; B60W 40/072; B60W 2554/803
See application file for complete search history.

(56) References Cited

U.S. PATENT DOCUMENTS

| | | | |
|---|---|---|---|
| 2007/0008090 A1* | 1/2007 | Gertsch | B60Q 9/00 340/435 |
| 2012/0209489 A1* | 8/2012 | Saito | B60W 30/18009 701/70 |
| 2012/0215415 A1* | 8/2012 | Schramm | B60W 30/143 701/93 |
| 2015/0112569 A1* | 4/2015 | Yamane | B60W 30/18145 701/72 |
| 2017/0225619 A1* | 8/2017 | Torii | G08G 1/167 |
| 2017/0369072 A1* | 12/2017 | Huber | B60W 50/14 |
| 2018/0345963 A1* | 12/2018 | Maura | G06K 9/00805 |
| 2020/0207372 A1* | 7/2020 | Akamatsu | G01C 21/3492 |

* cited by examiner

*Primary Examiner* — Dale W Hilgendorf
*Assistant Examiner* — Hana Lee
(74) *Attorney, Agent, or Firm* — Lorenz & Kopf LLP (57) ABSTRACT

The present application relates to a method and apparatus including a sensor for detecting a first vehicle speed, a camera operative to capture an image, a processor operative to determine a road curvature in response to the image, the processor further operative to determine a first predicted lateral acceleration in response to the road curvature and the first vehicle speed, the processor further operative to determine a second vehicle speed in response to the first predicted lateral acceleration exceeding a threshold value wherein the second vehicle speed results in a second predicted lateral acceleration being less than the threshold value, and to generate a control signal indicative of the second vehicle speed, and a vehicle controller operative to reduce a vehicle velocity to the second vehicle speed in response to the control signal.

20 Claims, 5 Drawing Sheets

METHOD AND APPARATUS FOR VISION BASED LATERAL ACCELERATION PREDICTION

BACKGROUND

The present disclosure relates generally to programming motor vehicle control systems. More specifically, aspects of this disclosure relate to systems, methods and devices for providing a vision based predictive lateral acceleration using a camera image and an image processing algorithm to generate a control signal for use by a vehicle control system.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various automated driver-assistance systems (ADAS), such as cruise control, adaptive cruise control, and parking assistance systems correspond to lower automation levels, while true "driverless" vehicles correspond to higher automation levels.

Adaptive cruise control systems have been developed where not only does the system maintain the set speed, but also will automatically slow the vehicle down in the event that a slower moving preceding vehicle is detected using various sensors, such as radar and cameras. Further, some vehicle systems attempt to maintain the vehicle near the center of a lane on the road. However, maintaining a lane speed that is too fast on a road curve could cause not only discomfort for vehicle occupants, but also, under some circumstances, the loss of vehicle control.

For a human driver approaching a curve at too high of a speed, vehicle control prior to normal curve steering begins with a reduction in vehicle speed. The deceleration level required for a curve depends on many factors, such as the curvature of the road, the vehicle speed, the curve bank angle, the road gradient, the road surface coefficient of friction, vehicle characteristics, driver competence, etc. Usually, a driver relies on his or her visual information about the upcoming curve to determine the proper speed and braking level.

The conventional implementations of the active safety approaches have been anti-lock braking and traction control systems to help drivers corner safely by sensing road conditions and intervening in the vehicle brake and throttle control selections. However, automated driving systems may be helped further by complimenting such control systems with strategies that intervene in vehicle control prior to entering a curve. It would be desirable to overcome the need for drivers to intervene and to these problems to provide a method and apparatus for predictive lateral acceleration control in an ADAS equipped motor vehicle.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, an apparatus including a sensor for detecting a first vehicle speed, a camera operative to capture an image, a processor operative to determine a road curvature in response to the image, the processor further operative to determine a first predicted lateral acceleration in response to the road curvature and the first vehicle speed, the processor further operative to determine a second vehicle speed in response to the first predicted lateral acceleration exceeding a threshold value wherein the second vehicle speed results in a second predicted lateral acceleration being less than the threshold value, and to generate a control signal indicative of the second vehicle speed, and a vehicle controller operative to reduce a vehicle velocity to the second vehicle speed in response to the control signal.

In accordance with another aspect of the present invention wherein sensor includes a global positioning system.

In accordance with another aspect of the present invention wherein the camera includes a forward mounted camera affixed to a vehicle.

In accordance with another aspect of the present invention wherein the road curvature may be determined in response to a deviation of a lane marker from a current vehicle path.

In accordance with another aspect of the present invention wherein the vehicle controller may be operative to reduce a throttle output in response to the control signal.

In accordance with another aspect of the present invention wherein the vehicle controller may be operative to increase a braking output in response to the control signal.

In accordance with another aspect of the present invention wherein the processor may be operative to engage an engine brake in response to the control signal.

In accordance with another aspect of the present invention including a global positioning system for determining a location and a map data and wherein the image is captured in response to the processor predicting a curve within a current vehicle path in response to the location and the map data In accordance with another aspect of the present invention a method including controlling a vehicle at a first speed and a first direction, capturing an image of a front field of view from the vehicle, determining a location of a lane marker in response to the image, predicting a curve in response to a deviation between the location of the lane marker and the first direction, predicting a first lateral acceleration in response to the deviation between the location of the lane marker, the first direction and the first speed, determining a second speed in response to the first lateral acceleration exceeding a threshold acceleration wherein the second speed is determined in response to the threshold acceleration and the deviation between the location of the lane marker and the first direction, and controlling the vehicle at a second speed.

In accordance with another aspect of the present invention including applying a friction brake in response to controlling the vehicle at the second speed.

In accordance with another aspect of the present invention including reducing a throttle setting in response to controlling the vehicle at the second speed.

In accordance with another aspect of the present invention including predicting a curve within a current vehicle path in response to a location and a map data wherein the image is captured in response to a prediction of the curve.

In accordance with another aspect of the present invention wherein the method may be performed by an automated driver-assistance system.

In accordance with another aspect of the present invention an apparatus for controlling a vehicle including a camera for capturing an image of a field of view, a sensor for measuring a first speed of the vehicle, a processor for detecting a lane marker in response to the image, for detecting a lateral deviation of the lane marker from a direction of travel of the vehicle, for predicting a lateral acceleration in response to the lateral deviation and the first speed of the vehicle, and a vehicle controller for reducing a vehicle speed to a second speed in response to the lateral acceleration exceeding a threshold, wherein the second speed is less than the first speed.

In accordance with another aspect of the present invention wherein the vehicle controller may be operative to apply a friction braking force to reduce the vehicle speed.

In accordance with another aspect of the present invention wherein the vehicle controller may be operative to reduce a throttle setting to reduce the vehicle speed.

In accordance with another aspect of the present invention wherein the vehicle controller may be operative to engage an engine brake mechanism to reduce the vehicle speed.

In accordance with another aspect of the present invention wherein the sensor includes a global positioning system.

In accordance with another aspect of the present invention wherein the sensor includes a wheel speed indicator.

In accordance with another aspect of the present invention including a global positioning system for determining a location and a map data and wherein the image is captured in response to the processor predicting a curve within a current vehicle path in response to the location and the map data.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
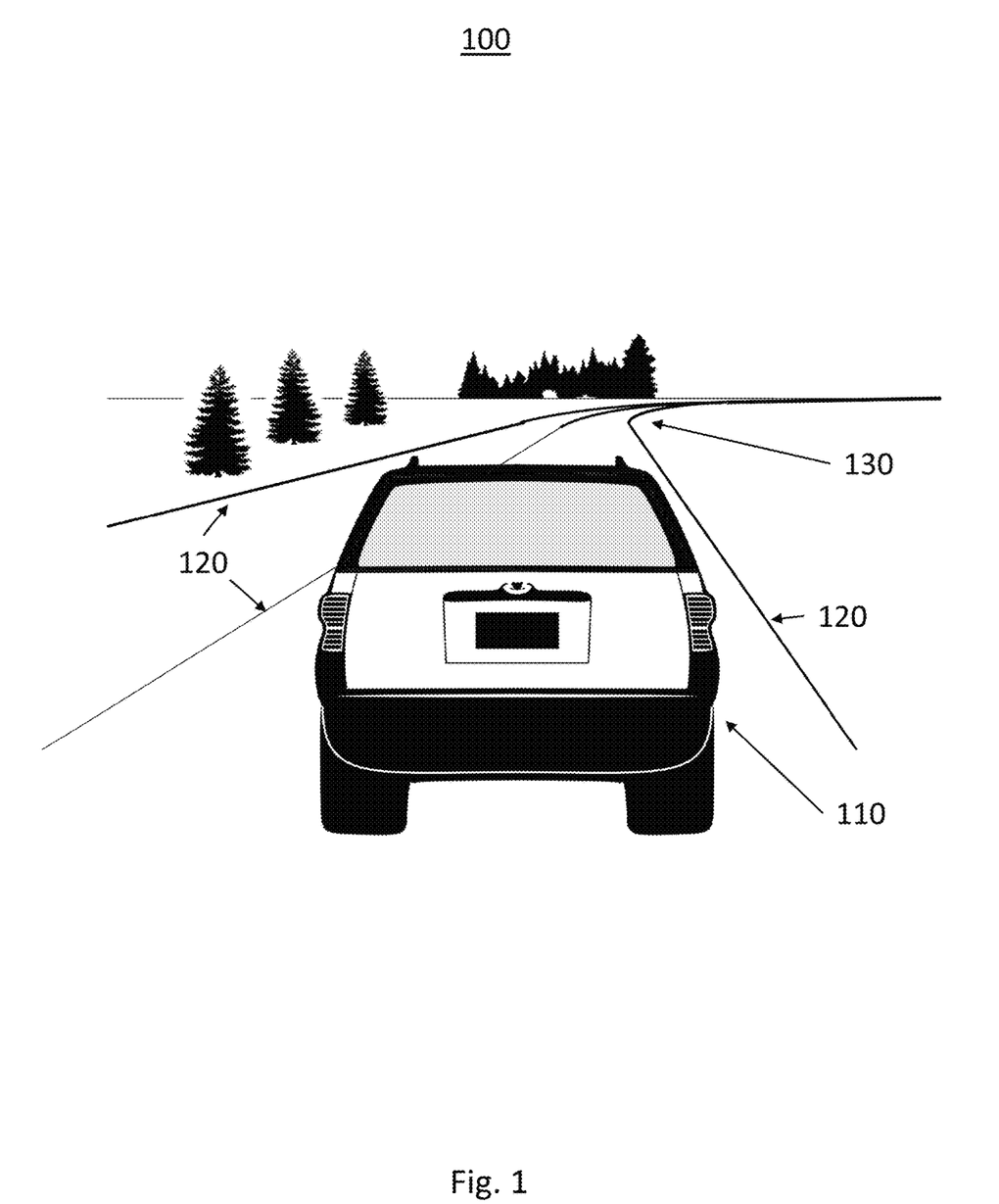
FIG. 1 shows an operating environment for vision based lateral acceleration prediction for a motor vehicle according to an exemplary embodiment.

FIG. 1 schematically illustrates an operating environment for vision based lateral acceleration prediction 100 for a motor vehicle 110. In this exemplary embodiment of the present disclosure, the vehicle is traveling along a road lane demarcated by lane markers 120. The road lane depicted is a straight road segment approaching a curved road segment 130. The vehicle 110 is operating in an assisted driving lane centering mode wherein the vehicle control system is operative to use cameras and other sensors to control the vehicle such that the vehicle 110 stays in the center of the driving lane. The exemplary vehicle 110 is equipped with a map database and a global positioning system (GPS) sensor and a low fidelity camera. It would be desirable for the ADAS system to predict the upcoming curve and adjust the speed of the vehicle accordingly.

In this exemplary embodiment, in order to predict the upcoming curve and control the vehicle accordingly, a control system of the vehicle 110 receives low fidelity camera data from the low fidelity camera in order to predict a lateral acceleration (PLA) of the vehicle 110. This prediction may provide a passive visual cue to the vehicle control system and provides notice of an upcoming curve in the road independent of GPS/Map Modules or other "online" information sources. The system is operative to detect at least one lane marker 120, or road surface edge, and compare this to the current straight line vehicle path. A curvature of the road is predicted in response to a deviation between lane marker 120 and the straight line vehicle path. The magnitude of the deviation is indicative of the magnitude of the curve. When the vehicle 110 has ADAS engaged, the vehicle speed may be modulated prior to corner entry in response to the predicted PLA. Under non ADAS operation, a driver mode alert may be used to provide warning of a predicted high lateral acceleration turn entry. In addition, the PLA may be used to provide occupant warnings or enable performance features within or outside of ADAS. The system may be further operative to generate an adaptive profile in response to driver inputs which correlates vehicle speed, steering wheel angle, IMU feedback, and vision based PLA, coupled with driver input settings. The adaptive profile tunes ADAS vehicle speed parameters if brake or acceleration pedal events initiated from the driver are observed to better suit driver comfort while driving through corners.

Figure 2:
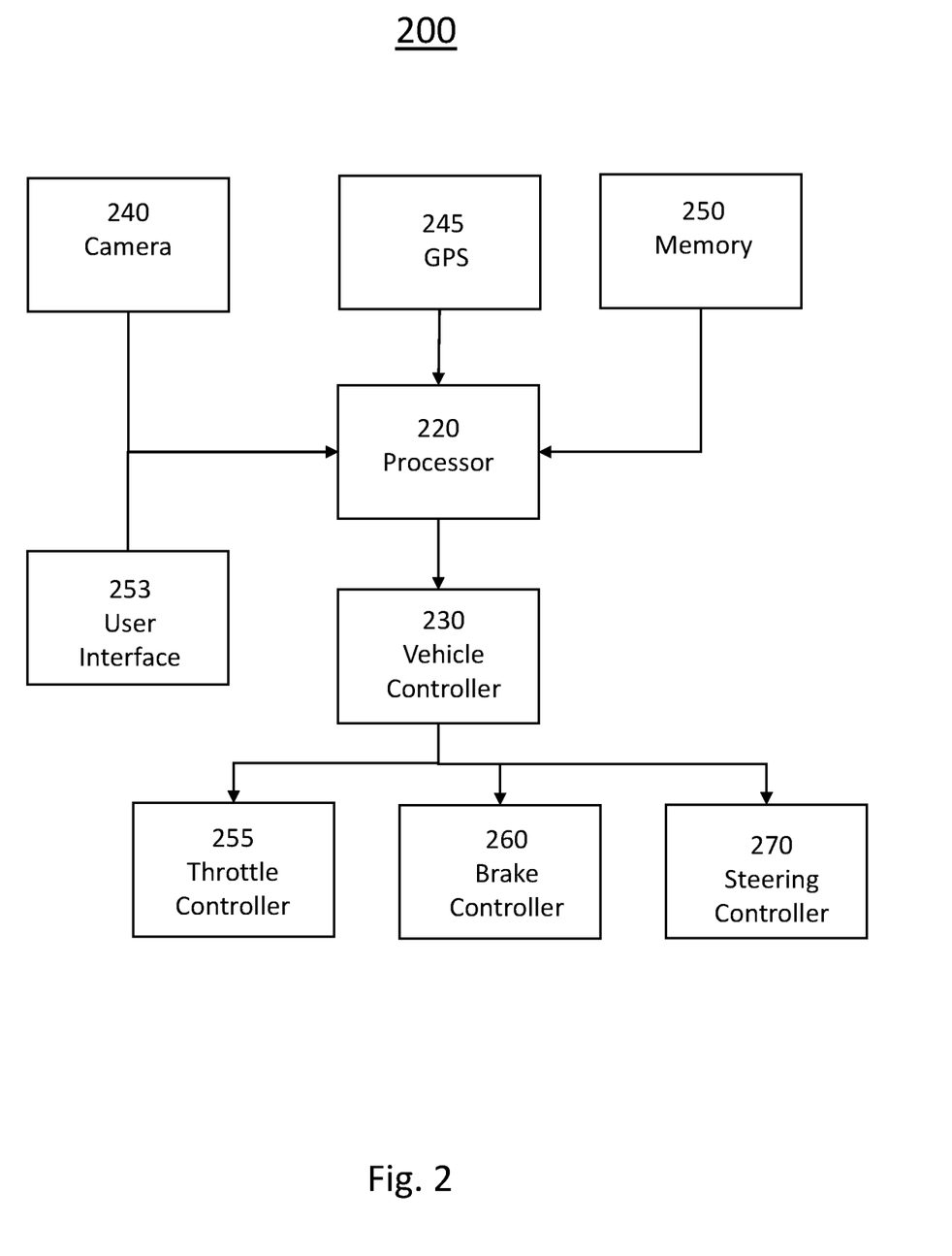
FIG. 2 shows a block diagram illustrating a system for vision based lateral acceleration prediction for assisted driving according to an exemplary embodiment.

Turning now to FIG. 2, a block diagram illustrating an exemplary implementation of a system for vision based lateral acceleration prediction for assisted driving 200 is shown. The system 200 includes a processor 220, a camera 240 and a GPS sensor 245. In addition, the processor 220 may receive information such as map data 250 from a memory or the like, and user input via a user interface 253.

The camera 240 may be a low fidelity camera with a forward field of view (FOV). The camera 240 may be mounted inside the vehicle behind the rear view mirror or may be mounted on the front fascia of the vehicle. The camera may be used to detect obstacles, lane markers, road surface edges, and other roadway markings during ADAS operation. In addition, the camera may be used to extract road curvature information via a conditioning buffer to predict the lateral acceleration of the vehicle in order to control the vehicle's speed prior to curve entry, providing up to 2 seconds of advanced notice to the driver.

The GPS sensor 245 receives a plurality of time stamped satellite signals including the location data of a transmitting satellite. The GPS then uses this information to determine a precise location of the GPS sensor 245. The processor 220 may be operative to receive the location data from the GPS sensor 245 and store this location data to the memory 250. The memory 250 may be operative to store map data for use by the processor 220.

The processor 220 is operative to engage and control the ADAS in response to an initiation of the ADAS from a user via the user interface 253. In an ADAS operation, the processor 220 may be operative to generate a desired path in response to a user input or the like wherein the desired path may include lane centering, curve following, lane changes, etc. This desired path information may be determined in response to the vehicle speed, the yaw angle and the lateral position of the vehicle within the lane. Once the desired path is determined, a control signal is generated by the processor 220 indicative of the desired path and is coupled to the vehicle controller 230. The vehicle controller 230 is operative to receive the control signal and to generate an individual steering control signal to couple to the steering controller 270, a braking control signal to couple to the brake controller 260 and a throttle control signal to couple to the throttle controller 255 in order to execute the desired path.

According to an exemplary embodiment, the processor 220 is operative to receive image data from the camera 240, location data from the GPS 245 and map data from the memory 250. The processor 220 is then operative to use image processing techniques with the image data to detect an upcoming curve. The processor 220 may be operative to integrate curvature signal and use a rolling buffer that filters a noisy camera and identifies a knee that represents a control curve in the road ahead. The processor 220 may then use this control curve to predict the expected bank angle corresponding to severity of curve and calculate the PLA based on an acceleration contribution of curve, centripetal bank, and vehicle acceleration. The processor 220 may then reduce the vehicle speed, zero the engine torque, or initiate a braking action based on the PLA of the vehicle within the road ahead.

In response to the PLA of the vehicle within the road ahead, the processor 220 may generate a control signal to couple to the vehicle controller 230. The control signal may instruct the vehicle controller 230 to reduce the throttle via the throttle controller 255 or to apply the friction brakes via the brake controller 260. The disclosed methods and apparatus may be used with any number of different systems and is not specifically limited to the operating environment shown here. The architecture, construction, setup, and operation of the system and its individual components is generally known. Other systems not shown here could employ the disclosed methods as well.

In an additional embodiment, the vehicle controller 230 may adjust the speed of the vehicle by reducing the throttle via the throttle controller 255 or to apply the friction brakes via the brake controller 260 in response to a driver profile saved in the memory 250. The driver profile may be generated in response to driver actions recorded during unassisted driving during comparable PLA conditions. For example, under a certain curve condition, the driver was operative to reduce speed entering the curve, coast through the curve, and accelerate out of the curve, the processor 220 or vehicle controller 230 may be operative to record these control levels and store them in a memory. When a similar curve condition is encountered during ADAS driving, the processor 220 may be operative to retrieve these saved control levels and to apply then in response to the ADAS curve response control. The fusion of vehicle path and vision to calculate instantaneous cornering radius is then correlated with a comfort setting of driver to improve driver comfort by adapting to an individual drivers preferences. This enables an ADAS to be truly adaptive by adjusting to driver feedback.

Figure 3:
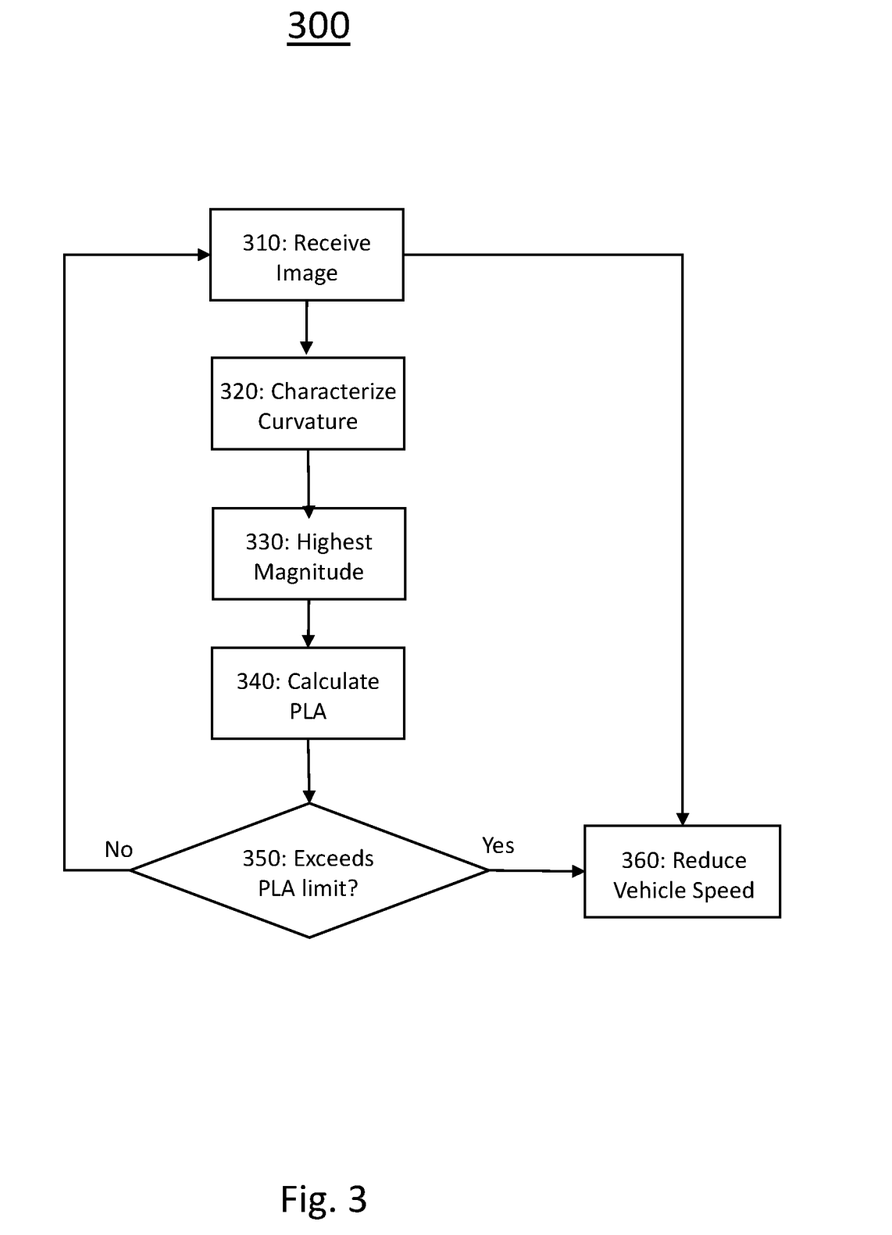
FIG. 3 shows a flow chart illustrating a method for vision based lateral acceleration prediction for assisted driving according to another exemplary embodiment.

Turning now to FIG. 3, a flow chart illustrating an exemplary implementation of a method for vision based lateral acceleration prediction for assisted driving 300 is shown. The method is first operative to receive an image 310 from the camera depicting a front FOV of the road ahead. The image may be converted into an image data file and coupled to an image processor and/or stored in a memory buffer.

The method is then operative to characterize a curvature of the road 320 ahead based on image data file. The image data is used to detect a centerline of the road by detecting a lane marker or edge of a road surface within the image. The method is then operative to calculate the curvature of the road by estimating a deviation of the centerline of the road with the centerline of the vehicle path at periodic intervals, such as once every meter. These deviations may be stored in a rolling buffer as the vehicle moves forward and subsequent deviations used to continuously determine the curvature of the road.

The method is then operative to determine at which distance the curvature of the road has the highest magnitude 330 or where the curve is the sharpest. This highest magnitude is determined by finding the point at a curve with the smallest radius of curvature. The method is then operative to use a rolling buffer to identify a knee (curve) and output this control curve.

The method is then operative to calculate the PLA 340 of the road ahead using control curve, expected bank angle, vehicle speed and vehicle acceleration. The PLA is determined in response to the sum of the centripetal acceleration and the tangential acceleration.

$$PLA = \frac{v^2}{r} + g*\sin(\emptyset)$$

The method is then operative to determine if the PLA exceeded lateral acceleration limit 350. The lateral acceleration limit, or the threshold, is determined in response to a safe vehicle speed for the magnitude of the curve ahead. If the lateral acceleration limit is exceeded, the method is operative to reduce vehicle speed lower than lateral acceleration limit 360. The method may reduce the throttle in order to coast the vehicle or may initiate application of the brakes if necessary. If vehicle will exceed lateral acceleration limits the method may be operative to determine how far vehicle is from the curve. If the distance is sufficient, the throttle may be reduced to all the vehicle to coast into the curve. If the vehicle is less than the sufficient distance, appropriate vehicle braking may be executed. When the vehicle enters the curve, the vehicle speed may then be adjusted in response to an inertial measurement in response to the measured lateral acceleration. If the lateral acceleration limit is not exceeded, the method is operative to return to receiving a subsequent image from the camera 310.

In order to avoid driver interruption of an ADAS operation by a driver experiencing an undesirable vehicle performance response, such as uncomfortable forces around corners, the method may be operative to generate an adaptive profile which correlates vehicle speed, steering wheel angle, IMU feedback, and vision based PLA, coupled with driver input settings. The profile tunes ADAS vehicle speed parameters if brake or acceleration driver input events are observed to better suit the drivers comfort while driving through corners.

The method may be operative to monitor and record the application of brake or acceleration events to improve the correlation of ADAS with driver comfort. Adaptive corner speed control characteristics are generated in response to a fusion of vehicle path and vision to calculate instantaneous cornering radius and correlate with a preferred setting of driver. The methodology is adaptive to a specific driver style and is operative to determine road topology and driver style by correlation of vehicle path curvature and vision based curvature and perform iterative adaptation of desired lateral acceleration based driver reaction such as braking, acceleration override, or no action. An iterative learning and classification of driver style and comfort based on vision data, vehicle path, and driver feedback/behavior coupled with Vision Based Curve Speed Control, can be used to set lateral acceleration limits customized to a specific driver in order to engage preventative rather than reactive braking actions.

In an exemplary embodiment, the method would be first operative to identify ADAS is enabled. If the ADAS is enabled, the method is then operative to continuously to monitor for change in steering wheel angle and lateral acceleration. If a cornering event is identified, the method is then operative to calculate preferred instantaneous cornering speed from steering wheel angle, lateral acceleration and IMU data. The method is then operative to store this preferred instantaneous cornering speed in a memory.

The method is further operative to monitor for ADAS feature disengagement, such as a brake application or acceleration event. If a disengagement event occurs, the method is operative to store this data into an adaptive driver cornering profile. The adaptive driver cornering profile may be a statistical model which learns the optimal vehicle speed control preferred by a driver. The adaptive driver cornering profile is then stored in a memory for later retrieval by a ADAS processor or vehicle controller.

Figure 4:
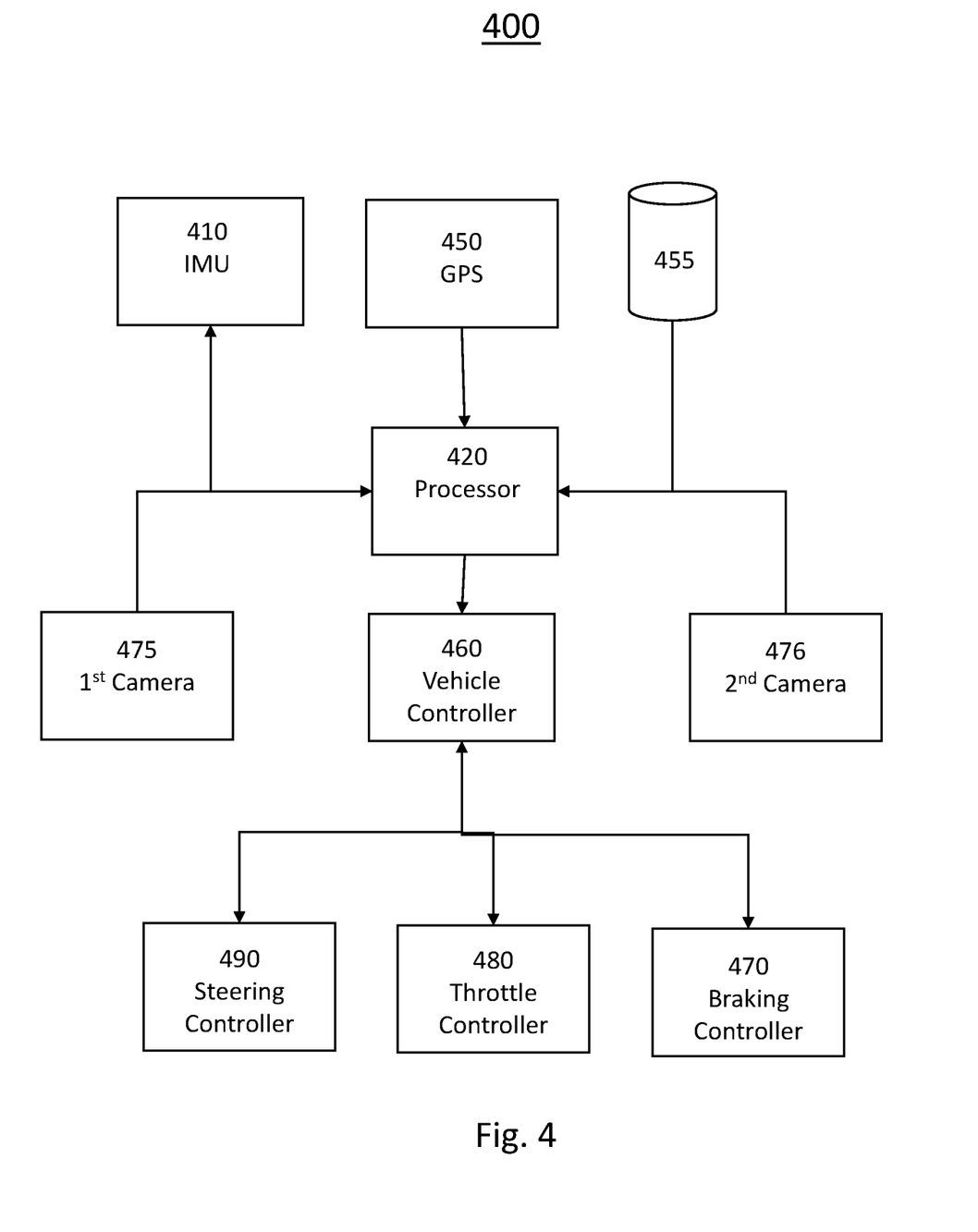
FIG. 4 shows a block diagram illustrating an exemplary implementation of a system for vision based lateral acceleration prediction for assisted driving in a vehicle.

Turning now to FIG. 4, a block diagram illustrating an exemplary implementation of a system for vision based lateral acceleration prediction for assisted driving 400 in a vehicle is shown. The system 400 may include an inertial measurement unit (IMU) 410, a GPS 450, a memory 455, a processor 420 a vehicle controller 460, a first camera 475, a second camera 476, as steering controller 490, a throttle controller 480 and a braking controller 470.

The IMU 410 is a device used to report a specific force of a body. The IMU 410 may measure angular or linear acceleration and may be used to determine a lateral acceleration, a longitudinal acceleration, a yaw rate and pitch of a vehicle. The GPS 450 is operative to calculate a current vehicle location in response to signals received from various GPS satellites indicative of a transmission time and a satellite location. The IMU 410 and GPS 450 may be used to determine a current vehicle speed and the current vehicle direction or vehicle path. The IMU 410 and GPS 450 may be used to determine if the current vehicle path is a straight line path or a curved path.

The first camera 475 is operative to capture an image of a field of view (FOV) around the vehicle. In an exemplary embodiment, the FOV is a front facing FOV capturing the roadway ahead of the vehicle. For example, the first camera 475 the camera may be a forward mounted camera affixed to the front fascia of a assisted driving equipped vehicle. The image may capture lane markings, road surface edges and indicators as well as obstacles and other vehicles. The system may optionally include a second camera 476 for capturing a second FOV. In some embodiments the front facing FOV and the second FOV may overlap and the images from the first camera 475 and the second camera 476 may be used to perform redundant operations. In an alternative embodiment, the first image may be captured in response to the processor predicting a curve within a current vehicle path in response to the location and the map data.

The processor 420 is operative to receive a first image from the first camera 475, a second image from the second camera 476, and additional data from the IMU 410, the GPS 450 as well as the memory 455. The processor 420 is then operative to determine a road curvature in response to the first image and/or the second image. The road curvature may be determined in response to a deviation of a lane marker from a current vehicle path. The processor 420 is further operative to determine a first predicted lateral acceleration in response to the road curvature and the first vehicle speed. The processor 420 may then determine a second vehicle speed in response to the first predicted lateral acceleration exceeding a threshold value wherein the second vehicle speed results in a second predicted lateral acceleration being less than the threshold value, and to generate a control signal indicative of the second vehicle speed. The threshold value may be the maximum lateral acceleration under which vehicle traction may be maintained under current weather conditions. Alternatively, the threshold value may be a lower level of lateral acceleration deemed comfortable for the average vehicle occupant.

In this exemplary embodiment, the vehicle controller 460 is operative to reduce the vehicle velocity to the second vehicle speed in response to the control signal generated by the processor 420. The vehicle controller 460 may reduce the vehicle velocity by generating a throttle control signal to couple to the throttle controller 480 to reduce a throttle output. The vehicle controller 460 may generate a braking control signal in response to couple to the braking controller 470 in order to increase a braking output in response to the control signal. Further the vehicle controller may be operative to engage an engine brake in response to the control signal from the processor 420.

Figure 5:
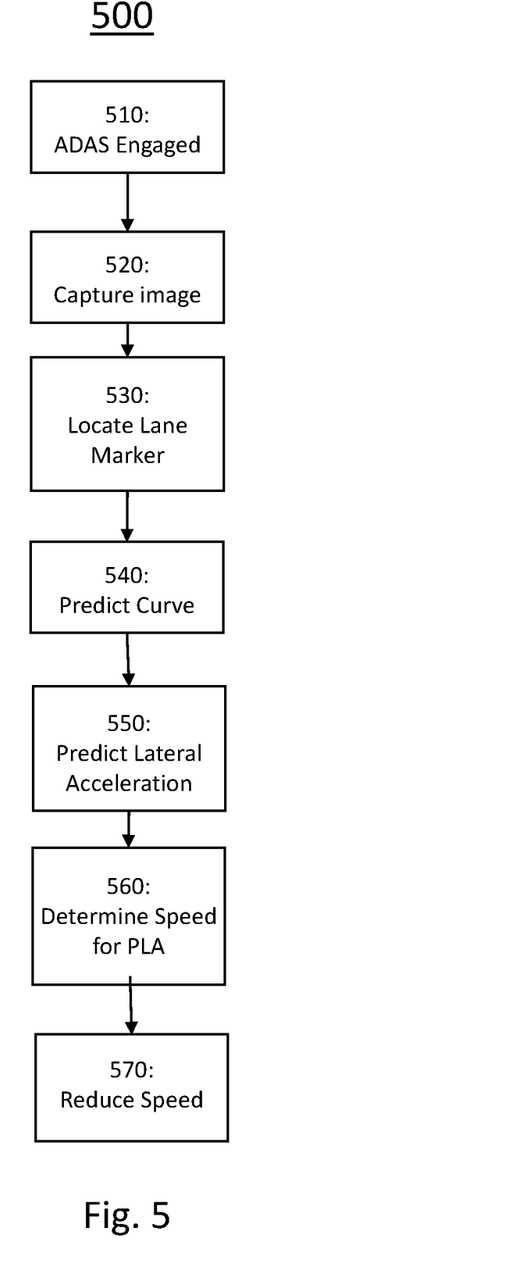
FIG. 5 shows a flow chart illustrating a method for vision based lateral acceleration prediction for assisted driving according to another exemplary embodiment.

Turning now to FIG. 5, a flow chart illustrating an exemplary implementation of a system for vision based lateral acceleration prediction for assisted driving 500 in a host vehicle is shown. In this exemplary embodiment the method 500 is first operative to control a vehicle at a first speed and a first direction is response to an ADAS algorithm 510. For example, the vehicle may be performing an adaptive cruise control function with lane keep assist. When controlling the vehicle, the vehicle controller may be generating control signals to couple to the steering controller, the braking controller and the throttle controller to maintain the vehicle in the center of the current lane and at a user determined velocity or a user defined distance from a leading vehicle within the lane.

The method is then operative to capture an image 520 of a front field of view from the vehicle. The image may be captured periodically, such as every 0.1 second, and the image stored in a buffer for retrieval by an image processor. The image may be captured by one forward facing camera or the image may be a combination of multiple images capture by multiple cameras and combined into a composite image with a forward field of view. In an alternative embodiment, the image may be captured in response to a prediction by a processor that the vehicle may be approaching a curve. This prediction of a curve within a current vehicle path may be made in response to a location and a map data wherein the image is captured in response to a prediction of the curve. The location data may be provided by a GPS and the map data may be retrieved from a memory or received via a wireless network, such as a cellular network. The map data may be received periodically or in response to a request by the processor.

The method is then operative to determine a location of a lane marker 530 in response to the image. The lane markers are located within the image using image processing techniques. Line detection algorithms may include Hough transform and convolutional based techniques. The method is then operative to predict a curve in the road 540 in response to a deviation between the location of the detected line and the straight line direction of travel of the vehicle. The greater the deviation of the line from the straight line direction, the greater the magnitude of the curve. The method may use these deviations from one or more lane markers to determine a lane centerline with the curve. The method may then be operative to generate a list of lateral deviations of the lane centerline from the straight line vehicle path and store this list in a memory. The list may be continuously updated as more of the road comes into range or view.

The method is then operative to predict a first lateral acceleration 550 in response to the deviation between the location of the lane marker, the first direction and the first speed. The predicted lateral acceleration may be determined response to the sum of the centripetal acceleration and the tangential acceleration of the vehicle in the predicted curve at the current vehicle speed. If the predicted lateral acceleration exceeds a predetermined threshold, the method is then operative to determine a safer speed 560 for comfortably navigating the predicted curve. The safer speed is determined in response to the predicted lateral acceleration exceeding a threshold acceleration wherein the safer speed is determined in response to the threshold acceleration and the deviation between the location of the lane marker and the straight line direction of the vehicle.

The method is then operative to reduce the vehicle speed 570 to the safer speed. The speed reduction may be accomplished in the vehicle by reduced by reducing a throttle setting in response to controlling the vehicle at the safer speed. The speed may be further reduced by applying a friction brake in response to controlling the vehicle at the safer speed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a sensor for detecting a first vehicle speed;
   a camera operative to capture an image;
   a processor operative to
   detect a lane marker in response to the image,
   predict an expected bank angle in response to the image,
   calculate a road curvature in response to a deviation between a straight line vehicle path and the lane marker at a plurality of locations,
   determine a first predicted lateral acceleration in response to a highest magnitude of the road curvature, the expected bank angle, a vehicle acceleration, and the first vehicle speed,
   determine a second vehicle speed in response to the first predicted lateral acceleration exceeding a threshold value and a prior vehicle speed determined in response to an observed control level during a prior driver automated driving assistance system (ADAS) disengagement while navigating a similar curve condition, wherein the second vehicle speed results in a second predicted lateral acceleration being less than the threshold value, and to generate a control signal indicative of the second vehicle speed; and
   a vehicle controller operative to reduce a vehicle velocity to the second vehicle speed in response to the control signal.

2. The apparatus of claim 1 wherein the sensor comprises a global positioning system.

3. The apparatus of claim 1 wherein the camera comprises a forward mounted camera affixed to a vehicle.

4. The apparatus of claim 1 wherein the road curvature is determined in response to a deviation of an edge of a road surface from a current vehicle path.

5. The apparatus of claim 1 wherein the vehicle controller is operative to reduce a throttle output in response to the control signal.

6. The apparatus of claim 1 wherein the prior driver ADAS disengagement includes at least one of a brake application and an acceleration event.

7. The apparatus of claim 1 wherein the prior driver ADAS disengagement includes a previous driver input during a prior ADAS operation.

8. The apparatus of claim 1 wherein the prior driver ADAS disengagement includes a driver braking control input during a prior ADAS operation.

9. A method comprising:
   controlling, via instructions provided by a processor, a vehicle at a first speed and a first direction;
   capturing, via a camera, an image of a front field of view from the vehicle;
   determining, via the processor, a location of a lane marker in response to the image;
   predicting, via the processor, a maximum road curvature in response to a deviation between a straight line vehicle path and the lane marker at a plurality of locations;
   predicting, via the processor, an expected bank angle in response to the image;

predicting, via the processor, a first lateral acceleration in response to the maximum road curvature, the expected bank angle, a vehicle acceleration, the first direction and the first speed;

determining, via the processor, a second speed in response to the first lateral acceleration exceeding a threshold acceleration and a prior vehicle speed determined in response to an observed control level while navigating a similar curve condition during a prior driver ADAS disengagement; and controlling the vehicle, via the processor, at a second speed.

10. The method of claim 9 further comprising applying a friction brake in response to controlling the vehicle at the second speed.

11. The method of claim 9 further comprising reducing a throttle setting in response to controlling the vehicle at the second speed.

12. The method of claim 9 further comprising predicting a curve within a current vehicle path in response to a location and a map data wherein the image is captured in response to a prediction of the curve.

13. The method of claim 9 wherein the method is performed by an automated driver-assistance system.

14. An apparatus for controlling a vehicle comprising:
a camera for capturing an image of a field of view;
a sensor for measuring a first speed of the vehicle;
a processor for detecting a lane marker in response to the image, for predicting an expected bank angle in response to the image, for detecting a lateral deviation of the lane marker from a direction of travel of the vehicle, for predicting, a maximum lateral deviation in response to the lateral deviation at a plurality of locations, for predicting a lateral acceleration in response to the maximum lateral deviation, the expected bank angle, a vehicle acceleration and the first speed of the vehicle; and a vehicle controller for reducing a vehicle speed to a second speed in response to the lateral acceleration exceeding a threshold and a prior vehicle speed determined in response to an observed control level while navigating a similar curve condition during a prior driver ADAS disengagement, wherein the second speed is less than the first speed; and a vehicle controller operative to control the vehicle at the second vehicle speed.

15. The apparatus for controlling a vehicle of claim 14 wherein the vehicle controller is operative to apply a friction braking force to reduce the vehicle speed.

16. The apparatus for controlling a vehicle of claim 14 wherein the vehicle controller is operative to reduce a throttle setting to reduce the vehicle speed.

17. The apparatus for controlling a vehicle of claim 14 wherein the vehicle controller is operative to engage an engine brake mechanism to reduce the vehicle speed.

18. The apparatus for controlling a vehicle of claim 14 wherein the sensor comprises a global positioning system.

19. The apparatus for controlling a vehicle of claim 14 wherein the sensor comprises a wheel speed indicator.

20. The apparatus for controlling a vehicle of claim 14 further comprising a global positioning system configured for determining a location and a map data and wherein the image is captured in response to the processor predicting a curve within a current vehicle path in response to the location and the map data.

* * * * *